Oct. 9, 1951     J. M. PEARSON     2,571,058
FLOWMETER
Filed Aug. 19, 1947     2 Sheets-Sheet 1

Measures water flow for pressurizing well and transmits acoustically the measure up the rod or cable.

INVENTOR.
John M. Pearson
BY
Busser and Harding
Attorneys

Oct. 9, 1951    J. M. PEARSON    2,571,058
FLOWMETER
Filed Aug. 19, 1947    2 Sheets-Sheet 2
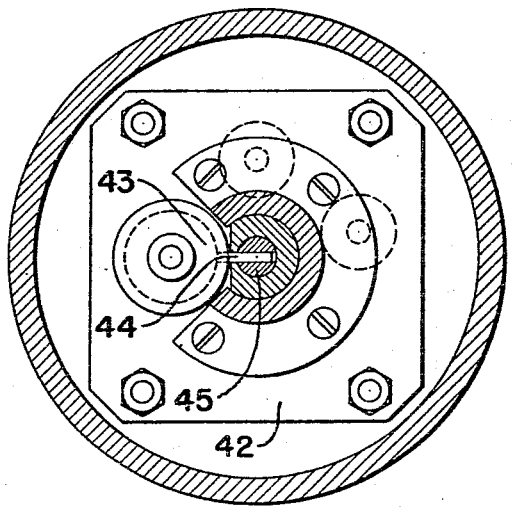
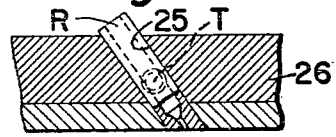
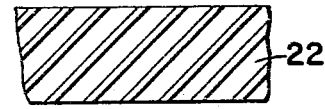
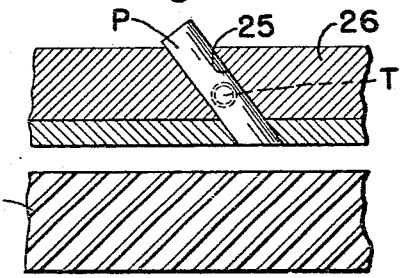
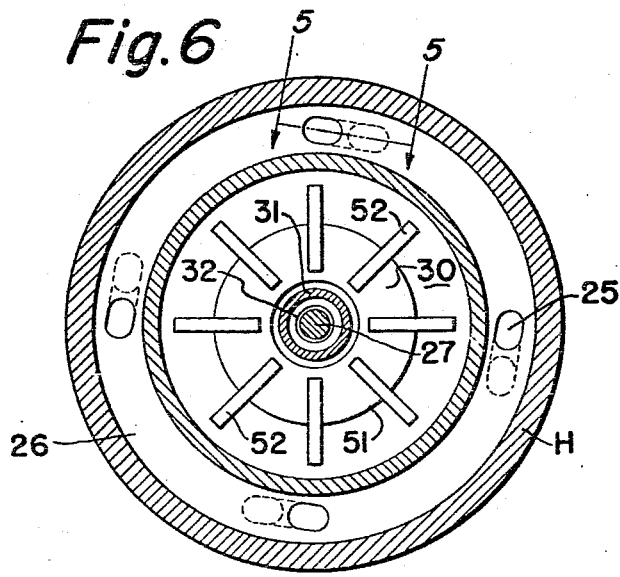
INVENTOR.
John M. Pearson
BY
Busser and Harding
Attorneys Patented Oct. 9, 1951

2,571,058

UNITED STATES PATENT OFFICE 2,571,058

FLOWMETER

John M. Pearson, Swarthmore, Pa., assignor to Sun Oil Company, Philadelphia, Pa., a corporation of New Jersey Application August 19, 1947, Serial No. 769,455

7 Claims. (Cl. 116—112)

This invention relates in general to flowmeters and, particularly, to that class of flowmeters adapted to transmit acoustically the measure of the flow of liquids in a well borehole.

It is an object of this invention to disclose a flowmeter adapted to measure the passage of liquid through the body of the device and periodically transmit the measure of flow by acoustically vibrating the member which positions it in the liquid flow.

Another object is to disclose a flowmeter of two chambers, one of which encloses the acoustical transmitting device in an oil bath, and the flow measure apparatus of the rotor type is mounted in the second chamber.

Yet another object is to disclose a flowmeter which is capable of long periods of operation submerged in borehole liquids under varying pressures.

Still a further object is to disclose a flowmeter for use in pressuring wells through which water or other fluids are transmitted to oil bearing strata as an aid to producing crude petroleum in the field. An application, Serial No. 743,646, filed April 24, 1947, disclosed a combination of elements especially designed to measure the flow of water downward in a well borehole to increase the pressure in the oil reservoir. Among the elements discussed was the flowmeter which forms the basis for the claims of this specification.

The flowmeter described eliminates all cables or electrical conductors as a necessary part of the equipment to be lowered into a well borehole and transmits the measure of the fluid flowing through it by setting up vibrations in the metal rod from which it depends. This and other advantages will be evident from the disclosed embodiment of the invention illustrated in the following drawings in which:

Figure 4 is a sectional view on line 4—4 of Figure 1.

Figure 5 is a section through line 5—5 on Figure 6.

Figure 6 is a section through line 6—6 on Figure 2.

Figure 7 is the section shown in Figure 5 showing insertable plugs.

Figure 1:
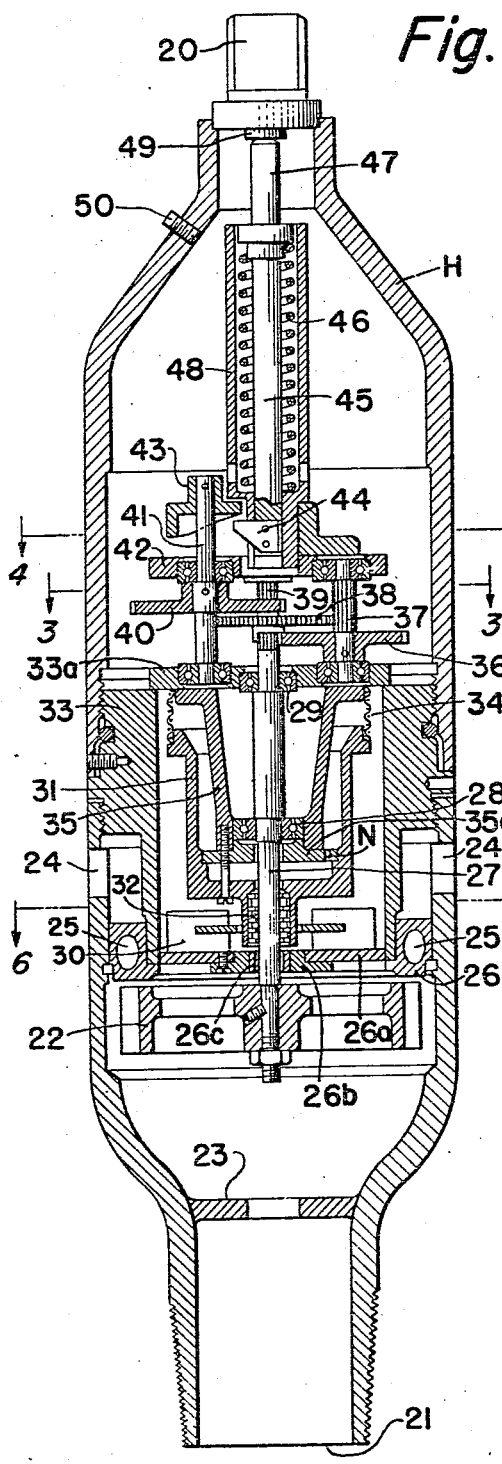
Figure 1 is a sectional view of the flowmeter in elevation.

The flowmeter of the rotatable impeller type, adapted to actuate a volume responsive striker to periodically vibrate the vibration transmitting member 20 is shown in Figure 1. The housing H is internally divided into an upper and lower chamber. The upper chamber is filled with lubricating oil and, in this disclosure, includes the liquid volume responsive mechanism. The lower chamber contains the stator ring and the vaned rotor and is open to the free downward passage of the well fluids. At the upper end, housing H is welded to the vibration transmitting member 20 so that the anvil 49, which is an extension of this member, projects into the body of the housing in proximity to the volume responsive striker or hammer 47. Housing H is threaded at the lower end to receive a flow restriction means such as a well bore packer. Aperture 21 permits the fluid to flow out of the housing after it has caused vaned rotor 22 in the lower chamber to rotate. An orifice plate 23 is welded at any convenient location within the housing H below the vaned rotor. The orifice 23 is of predetermined size and shape to cause the flowmeter to function at the peak efficiency by keeping the stator and rotor flooded.

A plurality of apertures 24 admit the fluid into the lower chamber of housing H so that it passes downward through angled nozzle opening 25 in the stator ring 26 and is deflected against rotor 22 at the proper angle. As part of the stator ring 26, the stator plate 26a spans the diameter of the housing at this point. An insert 26b in which a bushing 26c is supported, permitting the shaft 27 to pass freely therethrough, is removably inserted in the center of stator plate 26a. Bushing 26c is made of the same material as shaft 27 to prevent electrolytic action.

Figure 5 illustrates the position of nozzle opening 25 relative to vaned rotor 22 which directs the fluid prior to impingement on the vaned rotor. Also shown in this figure is a removable plug P, held in nozzle opening 25 by set screw T. Such a plug may be inserted in any combination of nozzle openings to change the range of flow rates measured by the flowmeter by giving the limited quantity of fluid more momentum in its action on the rotor. Under greatly reduced hydrostatic heads of well fluid interchangeable nozzles R of reduced cross-section may be inserted in the nozzle openings 25 and held in position by set screws T shown for holding plugs P, as illustrated in Figure 7. In summary, it will be evident that the capacity of the flowmeter and liquid volume responsive unit is made very flexible by several adjustments possible, for example, changing the orifice plate, inserting the proper size nozzle opening, by plugging one or several nozzle openings, or by any combination of these adjustments. Returning to Figure 1, the circular motion of vaned rotor 22 is transmitted through shaft 27 centrally disposed within housing H, and supported by bearings 28 and 29, to the volume responsive mechanism here shown in the upper chamber of the housing.

Before tracing the rotary motion through the gear train to the final operation of the volume indicator striker or hammer 47 in the upper chamber, several features of importance in the lower portion of the upper chamber of housing H adjacent the lower chamber should be explained. Concentric with the stator ring 36, and resting on stator plate 26a, a spider ring 30, shown in plan view in Figure 6, is centered around the lower projection of oil cup 31. This spider, composed of a supporting ring 51 (see Figure 6) and equally spaced vertical vanes 52, is designed to fit snugly around the lower projection of oil cup 31 and breaks any turbulent action as a result of rotation induced between shaft 27 and the bottom plate on which the spider ring 30 rests. A labyrinth 32, in close but not frictional contact with shaft 27, is let into the lower projection of oil cup 31 immediately below the clearance of the base of the cup and the shaft 27 through which the lubrication oil freely passes, to resist the upward flow of the well fluids. The space between oil cup 31 and the outside sleeve 33 is generally filled with the well fluid being measured up to a level approximating the top of spider 30 as shown in position in Figure 1. Above the level of the well fluid, the remaining volumes between the oil cup 31 on the inside and sleeve 33 on the outside is filled with a light machine oil. A screen 34, cylindrical in shape, is mounted between the upper part of oil cup 31 and the bracket or shield 35 which suspends bearing 28. The shield 35 is of solid construction to prevent contact between the lubricating oil within the shield and that surrounding it in the space defined by the oil cup 31 and is suspended from bearing plate 33a which, in turn, rests on sleeve 33. A plate 35a closes the bottom of the shield 35 and positions the oil cup 31, by bolts passing upward into the shield, as shown, in fixed spaced relation. This plate 35a clears the shaft 27, as shown, and is apertured as at N to transmit pressure through the lubricant in and around the oil cup 31. The screen 34, normally of a mesh of 120 wires per linear inch, is inserted to transmit the pressure caused by the well fluid backing up around spider 30. Later, in the discussion of the operation of the flowmeter, a detailed explanation of the purpose of the screen 34 will be given.

Figure 2:
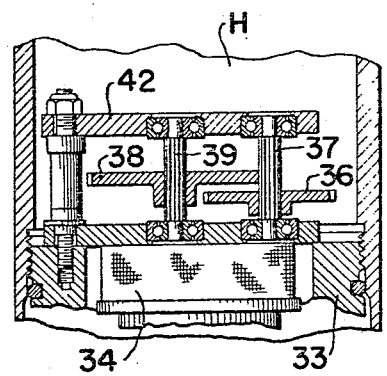
Figure 2 is a sectional view on line 2—2 of Figure 3.
Figure 3:
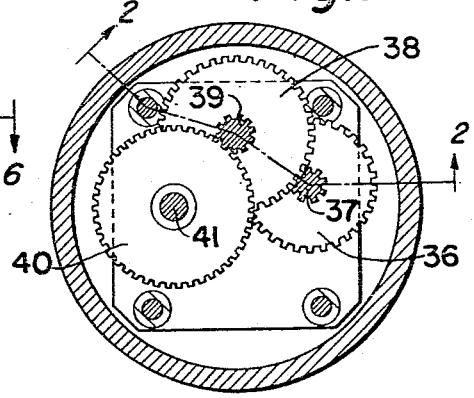
Figure 3 is a sectional view on line 3—3 of Figure 1.

Reference is now made to Figures 2, 3 and 4 in conjunction with Figure 1 for an understanding of the rotary motion transmitted through the reduction gear train of the liquid volume responsive mechanism in the upper chamber of housing H. The rotary motion of shaft 27, actuated by the rotor 22 of the flowmeter, is transferred to gear wheel 36. The rotation of splined shaft 37, which forms the shaft of gear wheel 36, is transferred to gear wheel 38. The splined shaft 39 of gear wheel 38 transmits rotary movement to gear wheel 40 with which it meshes. Shaft 41, to which gear wheel 40 is keyed, passes through bearing plate 42 and rotates cam 43 which is also keyed to it. Lug 44, fastened in a slot in rod 45 cooperates with cam 43 which retracts it once during each rotation through 360°.

Cam 43 is shaped to engage lug 44 at its uppermost position on a smoothly downward curving surface which, in rotating moves the lug and attached rod 45 downwardly and away from engagement with the anvil 49. Spring 46 is compressed as the cam depresses the lug 44 moving rod 45 and hammer 47, which is attached to the plunger, downward in guide 48. When the full rotation of 360° is completed, cam 43 releases lug 44 suddenly, releasing the compression in spring 46 and allowing hammer 47 to hit the anvil 49 on the bottom of the vibration transmitting member 20, setting up acoustical vibrations therein. It will be understood from the foregoing that the vaned rotor of the flowmeter will rotate many times to each blow of the volume responsive striker on the vibration transmitting member anvil. The flowmeter is so designed that a known quantity of fluid required to operate the meter over and above the minimum quantity per minute, is passed through the rotor for each action of the volume responsive striker so that the flow within the well can be accurately determined. The minimum flow rate for continuous operation is known and used as part of the calibration.

Although the functions of the separate parts of the flowmeter and volume responsive device will be clear from the above detailed descriptions, the operation will be discussed in broad terms for purposes of clarifying the overall operation with emphasis on the features which permit sustained operation while submerged in the liquids being measured. Plug 50 permits forcing lubricating oil into the upper chamber of housing H preparatory to lowering the device into the well casing. To preserve the lubrication of all gears and bearings and prevent the well fluids from washing away the lubricating oil, care must be taken to prevent air bubbles and leaks from interfering with the complete filling of the upper chamber in the housing body. This is accomplished by connecting a source of lubricating oil under pressure to the opening for plug 50, inverting the flowmeter and removing the insert 26b. The lubricant is then forced into the flowmeter in this inverted position until it flows out the opening usually closed by the insert. This insures the elimination of all air pockets in the device. To prevent bubbles of air forming in the lubricant, the meter is kept inverted until used. A lubricating oil of the type used to lubricate light machinery has been found to be the most satisfactory.

Under pressure the lubricating oil will fill all the upper chamber of the flowmeter housing above the stator ring 26 and within the sleeve 33. The remainder of the housing from the apertures 24 downward and outside sleeve 33, designated as the lower chamber, will be filled with the well liquids under operating conditions. As the pressure of the liquids increase due to the depth of liquid in the borehole in which the flowmeter is operating, the well liquids will back-up around shaft 27 and surround the spider 30. The labyrinth 32 will present greater resistance to the liquid flow by reason both of capillary forces and by close clearance than is in the open space between the sleeve 33 and the oil cup 31, causing the inflowing liquids to displace oil from the volume, including the baffle 30, until the internal and external hydraulic pressures are equalized, without displacing the oil in labyrinth 32. The lubricating oil, normally filling this space, floats above the well liquids and transmits the pressure through the mesh of screen 34, equalizes the pressure through the lubricating oil in the oil cup 31 with the pressure outside the cup, thereby maintaining lubrication of the lower bearing 28 and maintaining the labyrinth 32 full of oil. The shield 35, being of solid construction, prevents any turbulence caused by the rotation of shaft 27 from being transmitted to the lubricating oil in the oil cup, thereby assisting the undisturbed exchange of pressure. The undisturbed transmission of pressure maintained without turbulence by the construction and location of the shield 35 and the spider 30 maintains proper and constant lubrication of the bearings and prevents the well liquid from rising in the flowmeter. With the hydraulic pressures equalized, capillary forces maintain the labyrinth 32 full of oil under all operating conditions. As the screen 34 is a fine mesh and is wet with oil, water droplets, which may become mixed with the oil, are refused passage. The shaft 27 supported in the lowermost bearing 28, passes through plate 35a, the lower wall of the oil cup 31, stator plate 26a, and labyrinth 32 without frictional contact. This clearance permits the free circulation of lubricating oil and well liquids in pressure exchange contact. The apertures N in plate 35a are located so as to miss the solid shield 35, yet transmit the pressures in the lubricating oil within the oil cup 31 downwardly to the labyrinth 32 and upwardly to bearing 28 through the clearances around shaft 27, thereby resisting the upward flow of the well liquids along that path and diverting them around the oil cup 31 in the space adjacent sleeve 33.

For purposes of the most accurate readings, field tests show that the capacity of the meter used for illustration is between 100 barrels per day and 1000 barrels per day. For the lower flow rates plugs P (Figure 5) are inserted in several of the angular nozzles 25 of stator ring 26 and retained in place by a set screw T or other arrangement. In the device shown, four nozzles are drilled into the stator ring. This number may be increased, if desired, or decreased by plugging as described. In addition, interchangeable nozzles R of different cross sectional areas, held in place by set screw T, may be inserted in the original openings thereby increasing the force of the jet of well fluid against the rotor, as shown in Figure 7. Either method lowers the minimum flow rate which can be measured.

This description of the two-chambered flowmeter, with emphasis placed on the lubricating and adjustable features, discloses the mechanism which adapts it to the measurement of fluid, and acoustic transmission of the readings. The rotary motion of the vaned rotor 22, actuated by the downward passage of the well fluids through nozzles 25, is transmitted to the reduction gear train of the liquid volume responsive mechanism in the upper chamber of housing H, clearly shown in Figure 1. The rotation of gears 36, 38 and 40 cooperating with the splined shafts to which each gear is fixed as clearly illustrated in Figure 3, actuates cam 43 at a fixed ratio (above the minimum flow required to operate the mechanism) to the quantity of well fluid passing through vaned rotor 22. The liquid volume responsive striker mechanism is then activated. Hammer 47 is retracted by cam 43 moving lug 44 downward. Spring 46 is gradually compressed until the cam 43 has revolved through 360° when the sudden release permits the spring to drive hammer 47 sharply against the anvil 49. The vibration transmitting suspending member 29, of which anvil 49 is a part, receives the vibration set up by hammer 47 striking anvil 49.

While the preferred form of the invention has been disclosed, various changes may be made in the construction and application of the apparatus by those skilled in the art without departing from the spirit of the invention as claimed.

I claim:

1. In a flowmeter of the rotatable impeller type in which the housing is divided into separate chambers to enclose the operating parts and to direct the incoming liquid, the impeller rotation is transmitted to said operating parts by a shaft projecting through said housing and lubricating oil fills the operating parts chamber, the improvement in lubricating the bearings and preserving the efficiency thereof which comprises means to transmit the pressure of the well liquids throughout the lubricating oil in said housing; means to reduce the turbulence of the well liquids and lubricating oil within the housing to insure undisturbed pressure exchange between these mediums; and pressure directioning means to insure constant lubrication of all bearings.

2. In flowmeters of the rotatable impeller type in which a housing encloses the moving parts and the impeller rotation is transmitted to said moving parts by a shaft, the improvement which comprises a chamber within said housing filled with lubricating oil positioned to enclose the portion of the shaft centrally disposed therein and adjacent the liquid exposed end thereof; a cup concentric with said shaft, enclosed within the chamber and filled with lubricating oil; a labyrinth in the bottom of said cup concentric with the shaft at the exposed end; a pressure transfer means uniting said cup with the interior of said chamber; and means within the chamber between said pressure transfer means and the exposed end of the shaft to reduce the turbulent action of the liquid entering the housing around said shaft.

3. In flowmeters of the rotatable impeller type in which a housing encloses the moving parts and the impeller rotation is transmitted to said moving parts by a shaft, the improvement for lubricating the bearings which comprises a chamber within said housing filled with lubricating oil and concentrically positioned to enclose the end of the shaft exposed to the liquid and a cup concentric with said shaft, enclosed within the chamber and filled with lubricating oil; a labyrinth in the bottom of said cup enclosing the shaft at the exposed end; a wire mesh screen in the wall of said cup for transmission of pressure therethrough; and a plurality of baffles in said chamber externally of the oil cup to control the turbulence within the chamber at the rotating end of the shaft.

4. In flowmeters of the rotatable impeller type in which the housing is divided into separate chambers to enclose the operating parts and to direct the incoming liquid, the impeller rotation is transmitted to said operating parts by a shaft projecting through said housing, and lubricating oil fills the operating parts chamber, the improvement in lubricating the bearings and preserving the efficiency thereof which comprises an oil cup positioned concentrically along said shaft in the liquid admission chamber of the flowmeter and in communication with the oil filled chamber therein, an oil retaining labyrinth enclosing said shaft at the bottom of the oil cup adjacent the impeller, a wire-mesh screen in the wall of said oil cup to transmit the pressure of the measured liquid to the lubricant therein and means to reduce the turbulence of the liquid and the lubricating oil to insure undisturbed transmission of pressure throughout the flowmeter.

5. In flowmeters of the rotatable impeller type in which the housing is divided into separate chambers to enclose the operating parts and to direct the incoming liquid, the impeller rotation is transmitted to said operating parts by a shaft projecting through said housing, and lubricating oil fills the operating parts chamber, the improvement in lubricating the bearings and preserving the efficiency thereof which comprises an oil cup positioned concentrically along said shaft in the liquid admission chamber of the flowmeter and in communication with the oil filled chamber therein, an oil retaining labyrinth enclosing said shaft at the bottom of the cup adjacent the impeller, a wire mesh screen in the wall of said cup to transmit the pressure of the measured liquid to the lubricant therein and means to reduce the turbulence of the well liquid and the lubricating oil in said housing including a shield concentrically positioned in the oil cup and around the shaft, and a spider externally of the oil cup and between the screened pressure transmission area and the impeller.

6. A flowmeter to produce periodic acoustical vibrations in combination with a positioning member comprising a housing, an upper chamber within the housing apertured to receive the exposed end of said positioning member and containing lubricating oil, and a lower chamber apertured for the free passage of liquids to be measured; liquid volume responsive means in said upper chamber including a reduction gear train, a cam in rotatable cooperating engagement with said gear train, and a spring pressed rod releasably retractable by said cam, adapted to strike the exposed end of said suspending member to initiate the vibrations therein; a flow activated means in said lower chamber including an orificed stator ring, a rotor positioned coaxially therebelow; a rotatable shaft connecting said rotor with the reduction gear train; an oil cup enclosing said shaft and in communication with the upper chamber to receive lubricating oil therefrom; a labyrinth surrounding said shaft positioned in the lower wall of said oil cup adjacent the orificed stator ring in the lower chamber; a screened peripheral area in the top of said oil cup adjacent the top of said lower chamber to transmit the external pressure of the measured liquid equally throughout the housing through the lubricating oil, thereby insuring continuous bearing lubrication; turbulence counteracting means including a shield enclosing the shaft within the oil cup and a spider exterior the labyrinth and between the screened area and the stator ring.

7. The structure in claim 6 further characterized by means for insuring rotation of said rotor under varying liquid flow conditions including in combination interchangeable plugs and orifices of graded internal diameters removably insertable in the stator ring orifices above said rotor, in cooperation with an orifice placed below the rotor whereby the liquid passing therethrough is maintained in operating volume.

JOHN M. PEARSON.

REFERENCES CITED

The following references are of record in the file of this patent:

UNITED STATES PATENTS

| Number | Name | Date |
| --- | --- | --- |
| 476,217 | Rubenstein | May 31, 1892 |
| 1,440,778 | Foster | Jan. 2, 1923 |
| 1,652,472 | Erwin et al. | Dec. 13, 1927 |
| 1,945,776 | Hait | Feb. 6, 1934 |
| 1,953,677 | Glover | Apr. 3, 1937 |
| 2,002,908 | Mendenhall et al. | May 28, 1935 |
| 2,379,138 | Fitting et al. | June 26, 1945 |
| 2,428,677 | Nelson | Oct. 7, 1947 |